United States Patent [19]

Holt

[11] 4,446,242
[45] May 1, 1984

[54] SYNTHESIS OF REFRACTORY MATERIALS

[75] Inventor: Joseph B. Holt, San Jose, Calif.

[73] Assignee: The United States of America as represented by the United States Department of Energy, Washington, D.C.

[21] Appl. No.: 470,115

[22] Filed: Feb. 28, 1983

[51] Int. Cl.$^3$ .............................................. C04B 35/58
[52] U.S. Cl. ...................................... 501/96; 501/97; 501/98; 423/406
[58] Field of Search ............................ 501/96, 97, 98; 423/406, 410

[56] References Cited

PUBLICATIONS

Newsline Weekly Bull., Lawrence Livermore Nat. Lab., vol. 7, No. 25, Jun. 30, 1982.
Borovinskaya et al., Poroshkovaya Metallurgiya, No. 11 (191), pp. 42–45, 1978.
Merzhanov et al., Doklady Akademii Nauk USSR, vol. 204, No. 2, pp. 366–369, May 1972.
Holt, Industrial Research and Development, pp. 88–91, Apr. 1983.
Fedoroff et al., Encyc. of Explosives and Related Items, pp. A601–A619 (Picatinny Arsenal, Dover, N.J., USA 1960.

*Primary Examiner*—James Poer
*Attorney, Agent, or Firm*—Paul Davis; Hrold M. Dixon; Michael F. Esposito

[57] ABSTRACT

Refractory metal nitrides are synthesized during a combustion process utilizing a solid source of nitrogen. For this purpose, a metal azide is employed. The azide is combusted with a transition metal of the IIIB, IVB group, or a rare earth metal, and ignited to produce the refractory material.

20 Claims, No Drawings

SYNTHESIS OF REFRACTORY MATERIALS

The United States Government has rights in this invention pursuant to Contract No. W-7405-ENG-48 between the U.S. Department of Energy and the University of California, for the operation of Lawrence Livermore National Laboratory.

FIELD OF THE INVENTION

The present invention relates generally to the synthesis of refractory materials; more particularly, the invention relates to processes for synthesizing metal nitrides, as well as the corresponding compositions of matter.

BACKGROUND OF THE INVENTION

Refractories are those materials which can withstand very high temperatures. Although there is no well defined dividing line between refractories and non-refractories, most generally recognized refractories have softening temperatures in excess of 1500° C.

The usefulness of refractories depends upon an ability to maintain the mechanical functions at high temperatures, quite often in contact with corrosive liquids and gases. Frequently, they are employed to line furnaces and high temperature vessels. Refractories are also provided in a variety of physical forms and shapes, and can be comprised of plastics, ramming mixes, gunning mixes, casting mixes, etc. In particular, refractory nitrides are useful as crucibles in the melting of metals, and also as components of superhard cutting tools.

In one method of refractory material synthesis, nitrides are prepared by reacting a metal with nitrogen gas. This method, however, requires high furnace temperatures for long periods of time.

The strong exothermic heat effects of chemical reactions has been employed as a process for synthesizing nitrogen refractory materials. This combustion process, known as the self-propagating high temperature synthesis (SHS), has been utilized by numerous investigators.

Merzhanov, et al., discloses a process for the synthesis of refractory inorganic compounds, such as carbides, nitrides, borides, sulfides, and silicides. As disclosed, refractory inorganic compounds are formed utilizing the SHS process with the direct interaction of two chemical elements, one of which, the fuel (usually a metal), is in the condensed state, while the other, the oxiziding agent (non-metal), is either in a condensed or in a gaseous state. This combustion process is carried out in either constant pressure bombs or in special reactors, and initiated with an igniting device.

Borovinskaya, et al., discloses a similar approach employing the SHS process for the production of various refractory inorganic compounds. This process is directed to the synthesis of titanium nitrides, and employs high nitrogen pressures in the range of about 5 to 4500 atm. Beta solid solutions of nitrogen and titanium of various compositions ranging in Stoichiometry from $TiN_{0.5}$ to $TiN_{0.99}$ are obtained. In this case, high pressure equipment is required to reach full conversion.

One serious drawback of the SHS process is the low percent conversion of metal to nitride. The high adiabatic temperatures of the process, e.g., 3000° to 4800° C., cause the metal to melt as the combustion front propagates through the material. The molten metal forms an effective barrier to the inward diffusion of the nitrogen gas from outside the material.

Complete conversion is more likely to occur when high pressure $N_2$ gas is employed, e.g., 100–5,000 atm. Unfortunately, the high pressure equipment complicates the process and significantly reduces the advantage over conventional production methods.

It would be an advancement in the art of refractory inorganic material synthesis to provide a method for synthesizing such materials which would not employ high pressures. It would also be desirable to provide a method of synthesizing inorganic refractory material, resulting in nearly complete combustion of the metal starting material, and which is energy efficient. Of particular importance would be to achieve these goals and form refractory metal nitrides wherein the metal is a transition metal from the groups IIIB, IVB, or a rare earth metal.

SUMMARY OF THE INVENTION

Accordingly, an object of the invention is to provide refractory inorganic materials synthesized in a process which does not employ high pressures.

Another object of the invention is to provide refractory metal nitrides synthesized in a process which does not employ high pressures.

Another object of the invention is to provide refractory nitride compositions formed from a process which maximizes conversion of the metal to the refractory nitride.

Still another object of the invention is to provide refractory nitride materials formed from transition metals of the IIIB, IVB groups, and rare earth metals, formed from a process which does not employ high pressures, and yet maximizes conversion of the metal to the refractory nitride composition.

Additional objects, advantages and novel features of the invention will be set forth in part in the description which follows, and part will become apparent to those skilled in the art upon examination of the following, or may be learned by practice of the invention. The objects and advantages of the invention may be realized and attained by means of the instrumentalities and combination particularly point out in the appended claims.

To achieve the foregoing and other objects, and in accordance with the purpose of the present invention, as embodied and broadly described herein, the method of synthesizing refractory nitride compositions comprises mixing a metal azide with at least a stoichiometric amount of a transition metal of the IIIB,IVB groups or a rare earth metal. The resulting mixture is ignited, and the desired refractory material is formed.

In a further aspect of the present invention, in accordance with its objects and purposes, refractory compositions are formed by synthesis defined by the preceding method. In one embodiment of the invention, sodium azide is employed and ignited with a transition metal of the IIIB,IVB groups, or a rare earth metal, forming the desired refractory compositions.

The synthesis method of the present invention employs a solid source of nitrogen, and provides the synthesis of refractory nitrides without the use of high pressures. Additionally, conversion of the metal to the refractory nitride composition is maximized. The process of the present invention is energy efficient, and requires much less time than processes which are currently used. Composite refractory materials are synthesized by the process defined by the the present invention.

DESCRIPTION OF THE INVENTION

It has unexpectedly been discovered that refractory metal nitride compositions are formed from a combustion process utilizing a solid source of nitrogen, and the conversion of the metal to refractory nitride is maximized.

Metals which are utilized in the synthesis include the transition metals of groups IIIB, IVB and the rare earth metals and mixtures thereof. The preferred metals include Sc, Y, La, Ti, Zr, Hf, Yb, Er and the like.

The source of solid nitrogen is a metal azide. Suitable metal azides are formed from the alkaline earth metals and the alkali metals, as listed in Table I below. The preferred azide is $NaN_3$.

TABLE I

| | |
|---|---|
| Na $N_3$ | Be($N_3$)$_2$ |
| K $N_3$ | Mg($N_3$)$_2$ |
| Li $N_3$ | Ba($N_3$)$_2$ |
| Ca $N_3$ | Sr($N_3$)$_2$ |
| Rb $N_3$ | Br($N_3$)$_2$ |
| Co $N_3$ | |

The azides useful with the present invention are readily prepared from hydrazoic acid and the oxide or carbonate of the metal, or by metathesis of the metal sulfate with barium azide.

Sodium azide is readily prepared by reacting $NaNH_2$ with $N_2O$, as illustrated in the following equation:

$$2NaNH_2 + N_2O \rightarrow NaN_3 + NaOH + NH_3 \quad (1)$$

A complete description of this process is found in B. T. Fedoroff, et al., *Encyclopedia of Explosives and Related Items*, pages A601 to A619 (Picatinny Arsenal, Dover, N.J., USA 1960), incorporated herein by the reference.

Refractory nitride compositions are synthesized by mixing a metal azide, such as sodium azide, with at least a stoichiometric amount of a transition metal of the groups IIIB,IVB, a rare earth metal or a mixture thereof. The resulting mixture is ignited, and results in the formation of the desired refractory nitride composition.

Additionally, refractory composite materials can also be formed by the use of the synthesis methods disclosed herein. For example, a transition metal of the IIIB,IVB groups or a rare earth metal can be ignited with carbon and an azide to produce a compound comprising metal, carbon and nitrogen.

Some of the compositions of the present invention are uniform composites which are synthesized as disclosed herein and comprise a major amount of at least one nitride selected from IIIB and IVB groups, or a rare earth metal nitride and minor amounts of one or more alkaline earth or alkali metals and the corresponding alkaline earth or alkali metal azides. Major amount is at least about 90 percent, and preferably at least 95 percent. Minor amount is no more than about 10 percent, and preferably no more than about 5 percent.

Other composites of the present invention form nitrides in combination with aluminum oxide and nitrides in combination with borides. Exemplary composites are illustrated in the following equations:

$$3TiO_2 + 4Al + NaN_3 = 3TiN + 2Al_2O_3 + Na \uparrow \quad (2)$$

$$3ZrO_2 + 4Al + NaN_3 = 3ZrN + 2Al_2O_3 + Na \uparrow \quad (3)$$

$$3HfO_2 + 4Al + NaN_3 = 3HfN + 2Al_2O_3 + Na \uparrow \quad (4)$$

$$6Ti + 6B + NaN_3 = 3TiB_2 + 3TiN + 3Na \uparrow \quad (5)$$

$$6Zr + 6B + NaN_3 = 3ZrB_2 + 3ZrN + 3Na \uparrow \quad (6)$$

$$6HF + 6B + NaN_3 = 3HfB_2 + 3HfN + 3Na \uparrow \quad (7)$$

These compositions form uniform materials, and comprise a major amount of the reaction products and a minor amount of the starting materials. Major and minor are defined as above. The result is the formation of a refracting nitride compound in combination with $Al_2O_3$ or a boride compound in stoichiometric proportions.

The metal and metal azide are heated so that the top surface of the mixture is brought to the ignition temperature of the composition. Once this temperature is reached the process becomes self-sustaining. Suitable methods for heating or igniting the mixture include use of heated tungsten coils; pulsed laser beams; electric arcs; focused high intensity radiation lamps; solar energy; and the like.

A nitrogen atmosphere is preferably employed during the synthesis. A nitrogen pressure of about 1 atm is preferred.

The following examples are illustrative of the invention, and are not to be regarded as limiting its scope which is defined in the appended claims.

EXAMPLE I

Synthesis of TiN with $NaN_3$

TiN was synthesized from titanium and sodium azide, as illustrated by the following equation:

$$3Ti + NaN_3 \rightarrow 3TiN + Na \uparrow \quad (8)$$

A composition of 6.9 grams of Ti was mixed in a glass jar with 3.1 grams of sodium azide. A 6.8 gram sample was poured into a quartz crucible, which was placed inside a glove box inside a nitrogen atmosphere (1 atm). The glove box was pumped out first, and then backfilled with nitrogen. A tungsten coil was included in the glove box for the purpose of igniting the sample. The power to the tungsten coil was turned up to about 70 amps. Upon ignition a combustion wave was self-propagated in an irregular mode to the bottom of the quartz crucible. All the powder in the crucible was a deep golden yellow, indicating a successful run. The sodium was volatized during reaction and the amount of sodium left in the powder was determined by emission spectroscopy to be less than about 300 ppm.

EXAMPLE II

Synthesis of ZrN with $NaN_3$

Zirconium and sodium azide were mixed to synthesize ZrN as illustrated by the following equation:

$$3Zr + NaN_3 \rightarrow 3ZrN + Na \uparrow \quad (9)$$

Zirconium and sodium azide were mixed in stoichiometric amounts. A 9.12-gram sample of the mixture was poured into a quartz crucible. The crucible was placed in a glove box under a tungsten coil. The glove box was pumped out and backfilled with nitrogen (1 atm), and power to the tungsten coil turned on. The ignition continued for a couple of seconds. The materials left in the crucible was light yellow in color, and subsequent emission spectroscopy showed that less than about 300 ppm sodium remained.

Example III

Synthesis of HfN with NaN$_3$

Hafnium was reacted with sodium azide to yield hafnium nitride as illustrated by the following equation:

$$3Hf + NaN_3 \rightarrow 3HfN + Na \uparrow \text{ with NaN}_3 \quad (10)$$

Stoichiometric amounts of hafnium and sodium azide were mixed together in a glass jar. A 20.0-gram sample of the powder was cold-pressed into a ¾" diameter cylinder. The cylinder was placed in a glove box, and a tungsten coil was firmly placed against a face of the materials disposed in the cylinder. The box was evacuated and then backfilled with nitrogen. The coil ignited the sample, and the ignition continued for a couple of seconds. A dark yellow powder indicated that combustion had taken place. Emission spectroscopy analysis of the sample indicated less than about 300 ppm of sodium remaining.

EXAMPLE IV

Synthesis of TiC$_{0.5}$N$_{0.5}$ with NaN$_3$

The composite, TiC$_{0.5}$N$_{0.5}$ was synthesized pursuant to the following equation:

$$Ti + 0.5C + 0.1667NaN_3 \rightarrow TiC_{0.5}N_{0.5} + Na \rightarrow \quad (11)$$

47.9 grams of titanium, 6.0 grams of carbon, and 10.8 grams of sodium azide were mixed in a glass jar. This mixture was loaded into a quartz crucible and placed in a glove box. A tungsten coil light touched the top of the powder, and the box was pumped down to 300 microns and then backfilled with nitrogen (1 atm). The box was allowed to remain undisturbed for 10 minutes. Afterwards, the tungsten coil was heated and the mixture ignited. Emission spectroscopy of the sample revealed a sodium content of less than about 300 ppm.

EXAMPLE V

Synthesis of YbN with NaN$_3$

YbN is synthesized from the starting materials ytterbium and sodium azide. Sodium azide and ytterbium are mixed in stoichiometric amounts and poured into a quartz crucible. This sample is ignited in a nitrogen atmosphere of about 1 atm, resulting in the formation of YbN. Sodium is caused to vaporize during the ignition.

EXAMPLE VI

Synthesis of ErN with NaN$_3$

ErN is synthesized from the starting materials erbium and sodium azide. Sodium azide and erbium are mixed in stoichiometric amounts and poured into a quartz crucible. This sample is ignited in a nitrogen atmosphere of about 1 atm, resulting in the formation of ErN.

EXAMPLE VII

Synthesis TiN/Al$_2$O$_3$ Composite

The composite TiN/Al$_2$O$_3$ is synthesized from the starting materials TiO$_2$, Al and NaN$_3$ in stoichiometric amounts according to the method outlined in Example I, above to produce a uniform composite refractory material comprising stoichiometric amounts of TiN and Al$_2$O$_3$, e.g., 3TiN/2Al$_2$O$_3$.

EXAMPLE VIII

Synthesis of TiB$_2$/TiN Composite

The composite TiB$_2$/TiN is synthesized from the starting materials Ti, B and NaN$_3$ in stoichiometric proportions according to the method disclosed in Example I, above, to produce a uniform composite refractory material comprising stoichiometric amounts of TiB$_2$ and TiN, e.g., 1TiB$_2$/1TiN.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

I claim:

1. A method of synthesizing refractory nitride compositions, comprising:
   (a) mixing a metal azide with at least a stoichiometric amount of a transition metal of the IIIB, IVB groups, a rare earth metal or a mixture thereof;
   (b) igniting the resulting mixture of step (a); and
   (c) forming a refractory nitride composition.

2. The method according to claim 1, wherein said metal azide of step (a) is mixed in stoichiometric proportions with Al and an oxide selected from the group TiO$_2$, ZrO$_2$ and HfO$_2$.

3. The method according to claim 1, wherein said metal azide of step (a) is mixed in stoichiometric proportions with boron and a metal selected from Zr, Ti, and Hf.

4. The method according to claim 1, wherein said metal azide is an alkaline earth or alkali metal azide.

5. The method according to claim 1, wherein said azide is NaN$_3$.

6. The method according to claim 4, further comprising heating said mixture in a nitrogen atmosphere.

7. The method according to claim 4, wherein said mixture is ignited in a nitrogen atmosphere of about one atm.

8. The method according to claim 7, wherein said azide is reacted with the transition metal Ti to form TiN.

9. The method according to claim 7, wherein said azide is reacted with Zr to form ZrN.

10. The method according to claim 7, wherein said azide is reacted with Hf to form HfN.

11. The method according to claim 7, wherein said azide is reacted with Ti and C to form a composite having the formula TiC$_{0.5}$N$_{0.5}$.

12. A composition of matter synthesized according to claim 1 which is a uniform composite comprising a major amount of a least one nitride selected from the IIIB and IVB groups, a rare earth metal nitride, or a mixture thereof and minor amounts of one or more alkaline earth or alkali metal and the corresponding alkaline earth or alkali metal azides.

13. The composition of matter according to claim 12 further comprising major amounts of Al$_2$O$_3$ and minor amounts of TiO$_2$ and Al, wherein said uniform composite comprises major amounts of TiN and Al$_2$O$_3$ in the ratio of 3/2 respectively with minor amounts of TiO$_2$, Al and NaN$_3$.

14. The composition of matter according to claim 12 further comprising major amounts of Al$_2$O$_3$ and minor amounts of ZrO$_3$ and Al, wherein said uniform composite comprises major amounts of ZrN and Al$_2$O$_3$ in the ratio of 3/2 respectively with minor amounts of ZrO$_3$, Al and NaN$_3$.

15. The composition of matter according to claim 12 further comprising major amounts of TiB$_2$ and minor amount of B, wherein said uniform composite comprises major amounts of TiB$_2$ and TiN in substantially equal ratios and minor amounts of Ti, B and NaN$_3$.

16. The composition of matter according to claim 12 further comprising major amounts of ZrB$_2$ and minor amounts of B, wherein said uniform composite comprises major amounts of ZrB$_2$ and ZrN in substantially equal ratios and minor amounts of Zr, B and NaN$_3$.

17. The composition according to claim 12, wherein said azide is reacted with Ti to form TiN.

18. The composition according to claim 12, wherein said azide is reacted with Zr to form ZrN.

19. The composition according to claim 12, wherein said azide is reacted with Hf to form HfN.

20. The composition according to claim 12, wherein said azide is reacted with Ti and C to form the composition TiC$_{0.5}$N$_{0.5}$.

* * * * *